United States Patent [19]

Foreman et al.

[11] Patent Number: 5,369,709

[45] Date of Patent: Nov. 29, 1994

[54] APPARATUS FOR DISPENSING MONEY ORDERS

[75] Inventors: Jack C. Foreman, Carrollton; Billy J. Steiger, Desoto, both of Tex.; Gerald L. Heyen, Fridley, Minn.; Trent R. Voigt, The Colony, Tex.; James S. Carter, Denver, Colo.; Loren F. Blaney, Nederland, Colo.; Stephen J. Tierney, Littleton, Colo.; James K. Bill, Plymouth, Minn.

[73] Assignee: Travelers Express Company, Inc., Dallas, Tex.

[21] Appl. No.: 201,710

[22] Filed: Feb. 25, 1994

Related U.S. Application Data

[63] Continuation of Ser. No. 959,322, Oct. 9, 1992, abandoned.

[51] Int. Cl.⁵ .............................................. H04L 9/10
[52] U.S. Cl. ........................................................ 380/51
[58] Field of Search ......................... 380/51; 235/379; 464/405, 479

[56] References Cited

U.S. PATENT DOCUMENTS

| | | |
|---|---|---|
| 2,071,141 | 2/1937 | Placke . |
| 3,722,405 | 3/1973 | Mahoney et al. . |
| 3,814,227 | 6/1974 | Hurd, III et al. . |
| 3,848,798 | 11/1974 | Riley . |
| 3,970,992 | 7/1976 | Boothroyd et al. . |
| 3,984,660 | 10/1976 | Oka et al. . |
| 3,997,763 | 12/1976 | Schasser . |
| 4,025,905 | 5/1977 | Gorgens . |
| 4,035,792 | 7/1977 | Price et al. . |
| 4,053,735 | 10/1977 | Foudos . |
| 4,082,945 | 4/1978 | van de Goor et al. . |
| 4,175,694 | 11/1979 | Donabin . |
| 4,225,779 | 9/1980 | Sano et al. . |
| 4,266,121 | 5/1981 | Hirose . |
| 4,270,042 | 5/1981 | Case . |
| 4,317,028 | 2/1982 | Simjian . |
| 4,321,671 | 3/1982 | Ohsako . |
| 4,341,951 | 7/1982 | Benton . |
| 4,355,369 | 10/1982 | Garvin . |
| 4,385,285 | 3/1983 | Horst et al. . |
| 4,417,137 | 11/1983 | Lundblad . |
| 4,463,939 | 8/1984 | Watanabe . |
| 4,480,933 | 11/1984 | Shibayama et al. . |
| 4,501,224 | 2/1985 | Shibayama et al. . |

(List continued on next page.)

FOREIGN PATENT DOCUMENTS 1819124A 7/1986 European Pat. Off. .

OTHER PUBLICATIONS

"Automatic Money Order Dispenser, Model 1001", Entronics Corporation (1990).

(List continued on next page.)

Primary Examiner—Salvatore Cangialosi
Attorney, Agent, or Firm—Michael A. O'Neil

[57] ABSTRACT

A two-part money order dispenser for printing alphanumeric indicia on preprinted money order forms includes a terminal having a keyboard for operating the dispenser and a card swipe device for reading information from a magnetic card packaged with a bundle of blank preprinted money order forms for automatic entry of the forms-related information into a memory associated with the terminal when loading the forms into the dispenser. A printer having a memory association therewith is connected to the terminal for communicating with the terminal information allowing access to the printer through an encrypted password and communication of information necessary for printing money orders. Multilevel security codes having definable privileges associated therewith, a program generated security font, and a blank form retraction feature provided security against altered or counterfeit money orders. The configuration of the two-part dispenser further allows efficient utilization of limited or crowded counter space. The printer of the dispenser has an L-shaped configuration to facilitate its mounting at any convenient location.

42 Claims, 5 Drawing Sheets

U.S. PATENT DOCUMENTS

| | | |
|---|---|---|
| 4,545,695 | 10/1985 | Agata . |
| 4,593,407 | 6/1986 | Konishi et al. . |
| 4,611,286 | 9/1986 | Nishimura et al. . |
| 4,625,275 | 11/1986 | Smith . |
| 4,675,669 | 6/1987 | Goldman . |
| 4,699,532 | 10/1987 | Smith . |
| 4,733,887 | 3/1988 | Mowry, Jr. . |
| 4,749,213 | 6/1988 | Mowry, Jr. . |
| 4,757,537 | 6/1988 | Edelmann et al. ............ 380/51 |
| 4,802,218 | 1/1989 | Wright et al. ............ 380/51 |
| 4,812,986 | 3/1989 | Smith . |
| 4,813,912 | 3/1989 | Chickneas et al. ............ 380/51 |
| 4,864,618 | 9/1989 | Wright et al. ............ 380/51 |
| 4,870,596 | 9/1989 | Smith . |
| 4,894,784 | 1/1990 | Smith . |
| 4,960,981 | 10/1990 | Benton et al. . |
| 5,014,212 | 5/1991 | Smith ............ 364/479 |
| 5,021,967 | 6/1991 | Smith ............ 364/479 |
| 5,062,666 | 11/1991 | Mowry, Jr. . |
| 5,119,293 | 6/1992 | Hammond . |
| 5,121,432 | 6/1992 | Gilham et al. ............ 380/51 |
| 5,142,577 | 8/1992 | Pastor ............ 380/51 |

OTHER PUBLICATIONS

"Automated Money Order Dispenser", American Express Information Services Corporation, 1990.

"The Automatic Money Order Dispenser", Indiana Financial Systems, Inc.—Brandt/Sharp Authorized Sales/Service, 1989.

"Series T4325 Money Order Dispenser", Standard Register, 1991.

"The Automatic Money Order Dispenser, Model 1001", The Standard Register, 1991.

"AMOD 2000 Automated Money Order Dispenser—User's Guide", American Express Information Services Corporation, Dec. 1990.

"AMOD 2000 Automated Money Order Dispenser—Manager's Guide", American Express Information Services Corporation, Dec. 1990.

"Series T4300 Money Order Dispenser", The Standard Register Company, 1986.

"Series T4500 Official Items Disburser", The Standard Register Company, 1986.

"NTN Supermarket Payment Systems", National Transaction Network, Inc., 1990.

"The NTN Convenient Cash Machine", National Transaction Network, Inc., 1990.

"NTN Stand–Beside Supermarket Payment Solutions", National Transaction Network, Inc., 1990.

"NTN Integrated EFT Solutions for the IBM 4680 Store System", National Transaction Network, Inc., 1990.

"Micro–Max, an Integrated Financial Management System for Retail Petroleum Stations", Schlumberger Technologies, 1990.

"T4300 Money Order Dispenser—Executive Manual", The Standard Register Company, 1988.

APPARATUS FOR DISPENSING MONEY ORDERS

This application is a continuation of application Ser. No. 07/959,322, filed Oct. 9, 1992, now abandoned.

TECHNICAL FIELD

The present invention relates generally to apparatus for dispensing negotiable instruments, and more particularly to a two-part money order dispenser having a control terminal and a secured printer.

BACKGROUND OF THE INVENTION

Money are a well-known medium of exchange. The inefficiency and ease of producing counterfeit money orders associated with manual money order dispensers resulted in the fairly recent development of automatic money order dispensers having increased security and efficiency. Although comprising substantial improvements over manual money order dispensing systems, prior art automatic money order dispensers have been bulky, have printed slowly, have been difficult to reload with blank money order forms, have provided limited security against counterfeiting, and have failed to interface with existing computer and point of sale equipment of the money order agent.

Agents who are authorized by an issuer, i.e., the payor of the instrument, to issue money orders may consist of any of a number of different types of outlets such as convenience stores, check cashing agencies, grocery stores, financial institutions, or any of a number of other retail or financial outlets. In many agent locations there is insufficient counter space to accommodate a keyboard with a connected printer in one location on the counter. Thus, prior art automatic money order dispensers have not been suited for adaptable positioning in limited space areas.

Accordingly, there is a need to provide a two-part money order dispenser having separate keyboard and printing units for adaptable positioning on, above, or under limited counter space, to provide increased security against possible counterfeiting, and to increase compatibility with existing computer and point of sale equipment.

SUMMARY OF THE INVENTION

The present invention comprises a two-part money order dispenser which provides more convenient, secure, and efficient issuance of money orders. In a preferred embodiment of the invention, a control terminal is connected to a separate printer for communication of an encrypted password message to the printer signaling the performance of an algorithm generating the password, thereby allowing the printer to print a money order. Blank money order forms packaged in bundles of a predetermined number of fan folded forms are stored in the printer. An associated magnetic card containing information relating to size of the money order forms, the number of forms in the bundle, and the serial numbers of the forms is read by a card swipe device connected for communication with the terminal to facilitate simplified loading of the money order forms and serial number information.

A memory associated with the terminal stores multiple levels of security codes with each level having a different group of associated use privileges, thereby increasing security against the issuance of counterfeit money orders. A plurality of vendor names may be stored in the memory associated with the terminal for printing a vendor's name in a payee line on the money order form when vendor payments are made using money orders as the method of payment. Thus, when the vendor's name is printed on the money order, a driver or representative of the vendor will not be able to negotiate the money order.

To further avoid counterfeiting or altering of the money orders, a special program generated security font for printing the numerical indicia representing the dollar amount of the money order includes diagonal lineation between asterisks used as fill space when the money order is for smaller dollar amounts. The font also includes a "$" sign which is defined as an unprinted portion of the money order form surrounded by a printed background, whereas the numerical indicia is defined by a printed character on the unprinted background. Diagonal lineation appears between the "$" sign and numerical characters representing the dollar amount and between the individual numerical characters representing the dollar amount. Vertically printed abbreviations of the words "dollars" and "cents" further reduce the risk of alteration of the printed amount of the money order.

For added security, the printer retracts blank money order forms into the printer housing when printing is not occurring, such that a money order cannot be grasped and pulled from the printer. The money order forms are held in the retracted position when the power to the printer is turned off.

A particular issuing location may be readily identified by the printing of an agent's logo on the money order form. The logo is downloaded into the memory associated with the terminal and downloaded from the terminal memory to the memory associated with the printer where it is stored for all subsequent print requests.

The two-part configuration of the money order dispenser allows the terminal to be positioned for easy access on crowded counter space for entering the data necessary for the printing of a money order. The printer may be positioned in a location remote from the terminal. The housing of the printer has an angled, generally L-shaped configuration allowing the printer to be easily mounted under a counter, to be supported on top of and extend over the edge of a counter or another object on the counter, or to be positioned fully on the counter, thereby creating a diagonally sloped surface from which the money order is emitted.

The two-part configuration of the money order dispenser allows for connection of the printer directly to a point of sale device, either in conjunction with or separately from the control terminal, to allow printing instructions to be received by the printer directly from the point of sale device. The two-part configuration further allows connection for communication between the control terminal and the agent's computer system for interrogating the money order dispenser and printing of reports. A journal printer may be connected to the control terminal for printing sale reports, and a printer may be connected to a plurality of terminals to allow the issuance of money orders by more than one dispenser operator in more than one location. Thus, the two-part configuration allows existing computer and point of sale equipment to be utilized with the printer in printing money order forms and reports. Reports may be generated by the control terminal and printed on void money order forms by the printer, by a journal printer connected to the control terminal, or on a printer associated with the agent's computer or point of sale device.

The two-part configuration of the money order dispenser allows for more adaptive use of existing equipment, and limited or crowded space in the agent's location. The multiple security levels and associated privileges, as well as the security print font and money order form retraction feature increase the security associated with the issuance of money orders. The use of a magnetic card and card swipe device for rapid input of information relating to prepackaged bundles of blank money order forms facilitate efficient loading of forms into the printer. Thus, the various advantages of the present invention result in a more convenient, secure, and efficient dispenser for issuing negotiable instruments.

BRIEF DESCRIPTION OF THE DRAWINGS

For a more complete understanding of the present invention and the advantages thereof, reference is now made to the following Detailed Description taken in conjunction with the accompanying Drawings in which.

DETAILED DESCRIPTION

Figure 1:
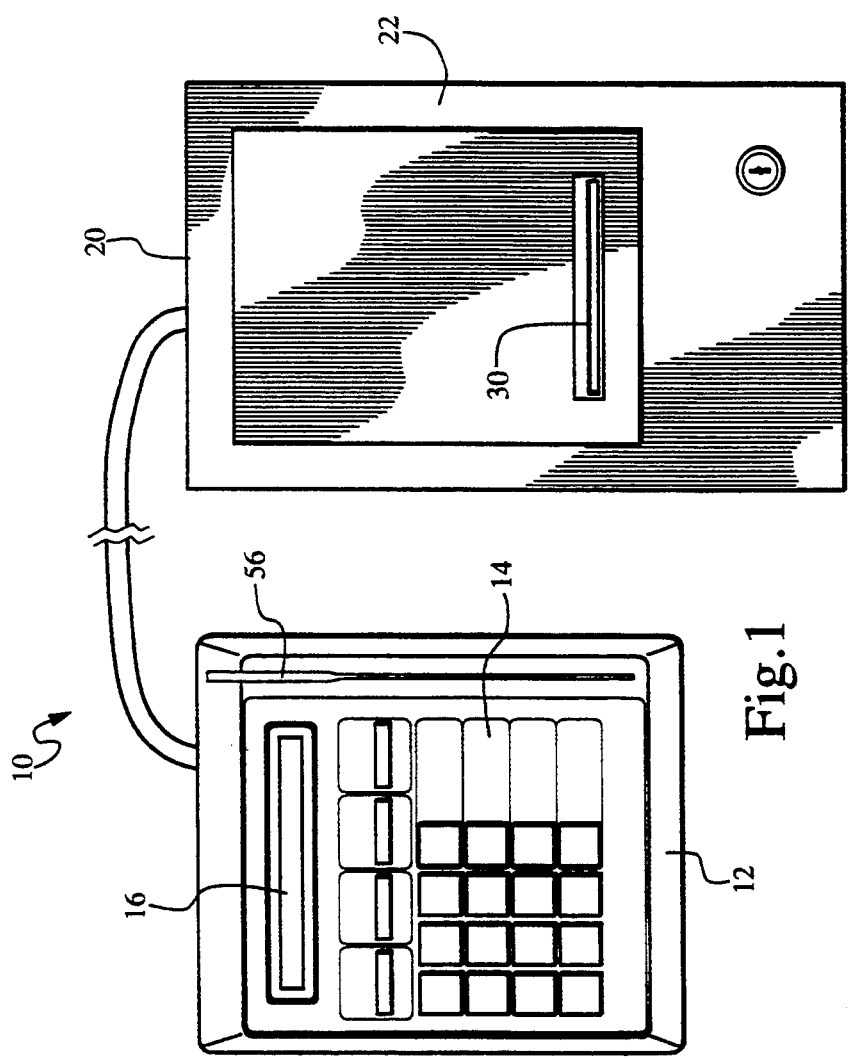
FIG. 1 is a front view of the two-part money order dispenser of the present invention.
Figure 2:
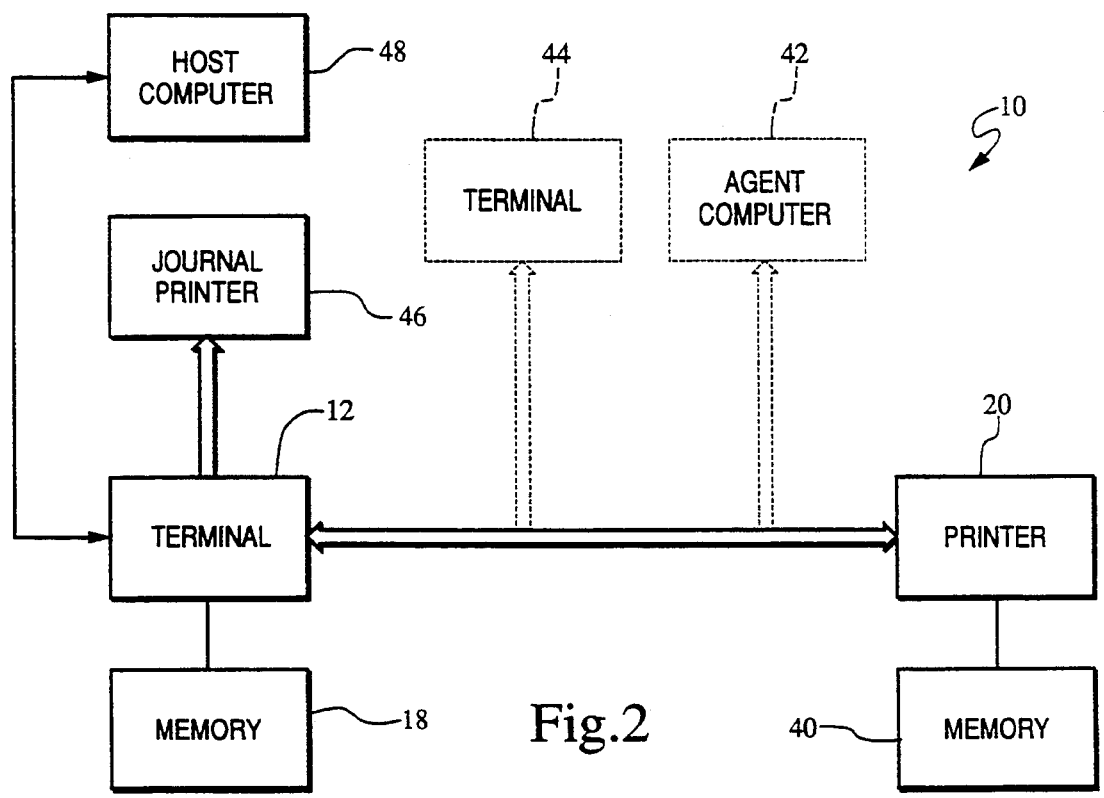
FIG. 2 is a block diagram of a money order dispenser system configuration incorporating the two-part money order dispenser of FIG. 1 connected for communication with a remote computer, journal printer, and optional connection to an additional terminal and agent's computer.

Referring now to the Drawings and more particularly to FIG. 1 thereof, there is shown a money order dispenser 10 incorporating the two-part money order dispenser of the present invention. A control terminal 12 has a keyboard 14 for operation of the money order dispenser 10 for issuing money orders, issuing alternate documents, printing reports, and other activities associated with the issuance of money orders. A display 16 provides a visual display of certain data entered through the keyboard, error flags, messages, and other information relevant to the operation of the dispenser. As is shown in FIG. 2, the program for operating the terminal 12 is stored in memory 18 associated with the control terminal 12. Transaction data, security codes, reports generated based upon the transaction data and various security codes entered are stored in the memory 18. The control terminal 12 is connected for communication with a printer 20 for printing money orders, and alternate documents such as gift certificates and vendor payments.

Figure 3:
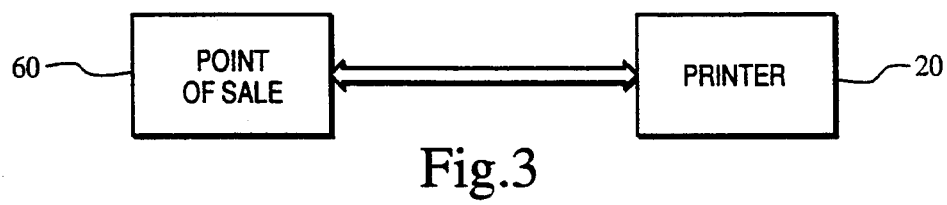
FIG. 3 is a block diagram of a system configuration incorporating a printer of the present invention connected for communication directly with a point of sale device.
Figure 4:
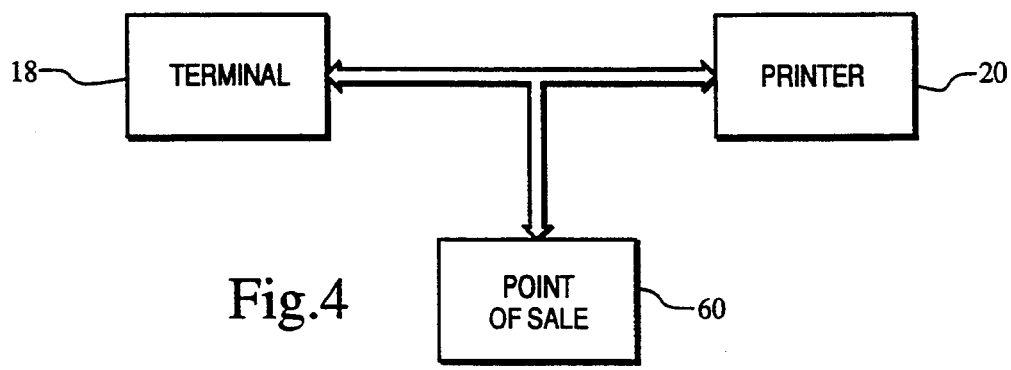
FIG. 4 is a block diagram of a system configuration incorporating a two-part money order dispenser connected to a point of sale terminal.

Referring now to FIGS. 1, 2, 3, and 4, the money order dispensers are placed in the agent's premises and are connected via telecommunications systems to the issuer's host computer 48. In many cases, an agent authorized by the issuer to issue money orders may own several stores or premises, each having a separate money order dispenser 10. In such cases, in addition to being connected to the host computer 48, the money order dispensers 10 may be connected to the agent's computer 42 at a remote location from the various store premises, or to multiple terminals 44, as shown in FIG. 2. In the instances wherein the money order dispenser 10 is installed in a convenience store, a grocery store, or some other location utilizing point of sale equipment, the dispenser may be connected for communication with the point of sale device 60, as shown in FIGS. 3 and 4. The dispenser may be connected for communication between the point of sale device 60 and both the terminal 12 and printer 20, or may be connected for communication directly with the printer 20 alone, as shown in FIG. 3.

Access to the printer 20 requires communication of an encrypted password based upon the serial number of the printer 20. The encrypted password is communicated from the control terminal 12 to the printer 20 and a decrypting algorithm is performed to produce the password allowing access to the printer 20 for printing a document. The password test is set out below:

---

The Password is a 12 digit number derived from the Print Unit Serial Number.

Method of encryption: ADD-SWAP-ADD

SN+Constant No. (1) swap+Constant No. (2) = Password

1. Add Constant number - 675901108768 (ignore carry)

-continued

```
2. Swap digits - B,6
         A,7   0 1 2 3 4 5 6 7 8 9 A B
         9,5   0 = Most significant
                   number
         8,2
         4,1
         9,0
         8,3
         B,1
3. Add Constant number - 508424383486 (ignore
                                         carry)
```

Method of Decryption: SUB-Reverse SWAP-SUB

Password-Constant No. (2) reverse Swap-Constant No. (1) = SN

```
1. Subtract Constant number 508424383486
   (borrow as needed)
2. Swap digits - B,1
         8,3
         9,0
         4,1
         8,2
         9,5
         A,7
         B,6
3. Subtract Constant number 675901108768
   (borrow as needed)
```

The password for accessing the printer 20 prevents the printer 20 from being removed from the money order agent's premises and being connected to an unauthorized computer terminal for printing of counterfeit money orders.

Figure 5:
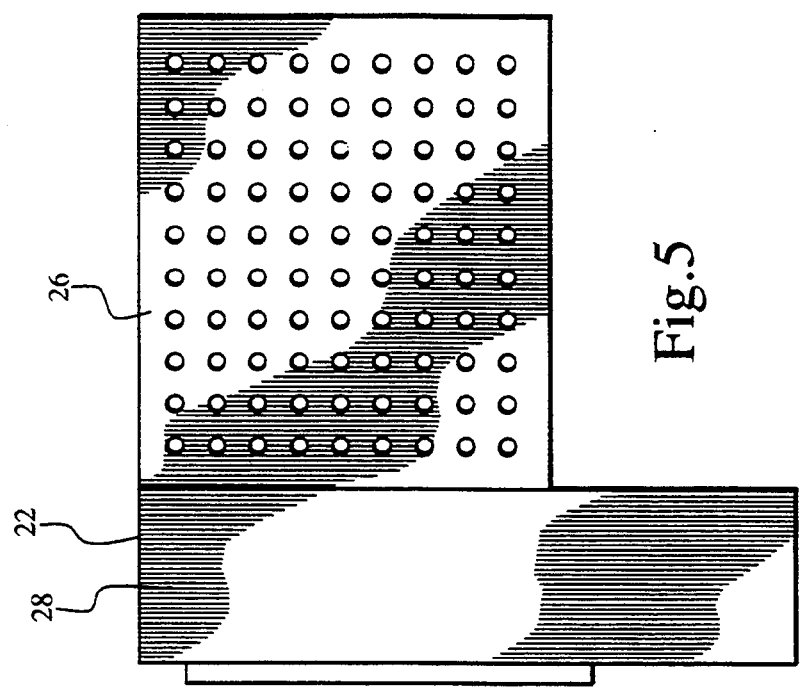
FIG. 5 is a side view of the printer portion of the money order dispenser of FIG. 1.
Figure 7:
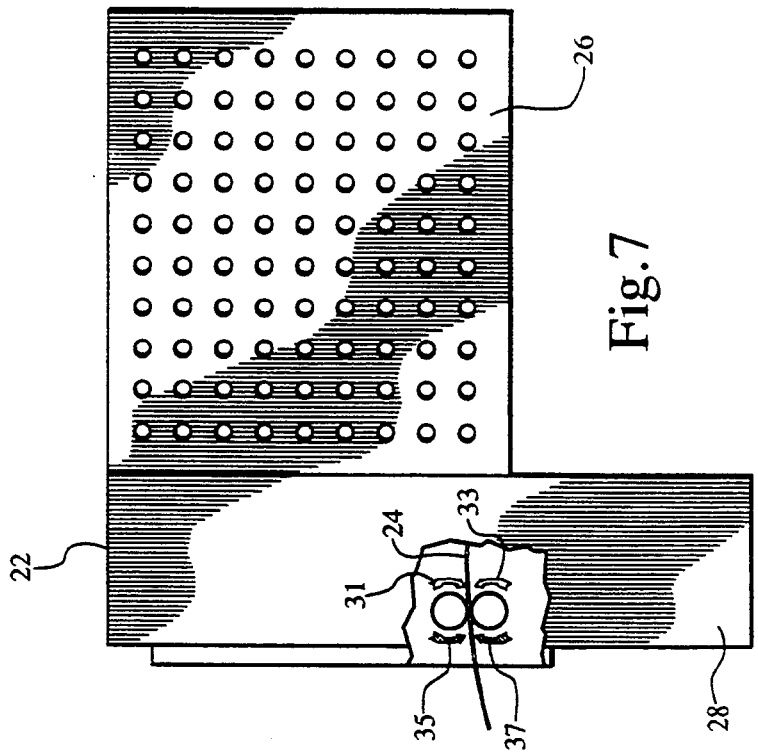
FIG. 7 is a partially broken away side view of the printer of FIG. 1 illustrating the retraction of the next sequential money order form when the printer is not printing or the printer is in a power-off state.

Referring now to FIGS. 1 and 5, the printer 20 is contained within a housing 22 wherein blank money order forms 24 (shown in FIG. 6) are stored in fan fold form. The housing is configured to have a substantially square body portion 26 and a face portion 28 mounted to the body portion 26 and extending downwardly therefrom to form an angled, generally L-shaped housing. As the money order forms 24 are fed through the printer 20, they exit the housing 22 through a print feed slot 30 extending transversely across the face portion 28 of the housing 22. As shown in FIG. 7, a feed mechanism 32 feeds the money order forms 24 through the feed slot 30 in the direction indicated by arrows 31 and 33 as they are printed, and retracts the next successive blank money order form in the direction shown by arrows 35 and 37 upon completion of the printing process. The money order forms 24 remain retracted when the printer 20 experiences a power-off condition. Thus, a blank money order form 24 is prevented from being grasped and withdrawn from the dispenser printer 20, thereby reducing the risk of production of counterfeit money orders.

Figure 9:
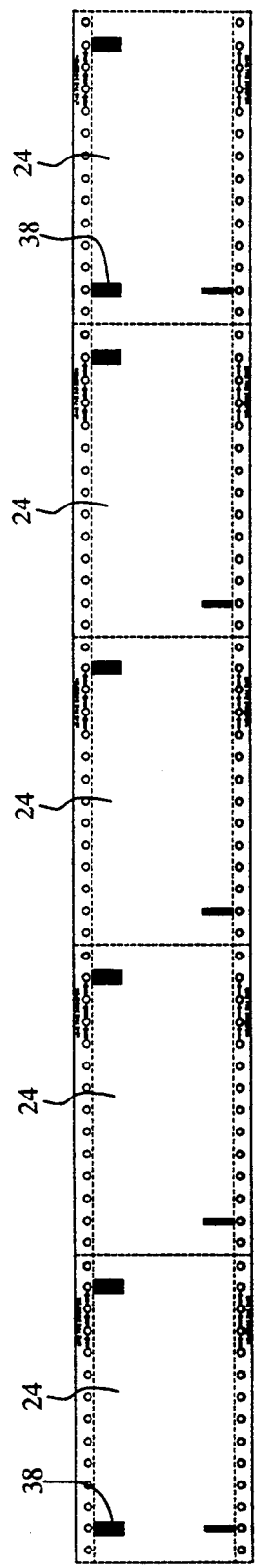
FIG. 9 is a top view of the back side of a series of blank money order forms illustrating the placement of timing marks on the back of every fourth money order form.
Figure 8:
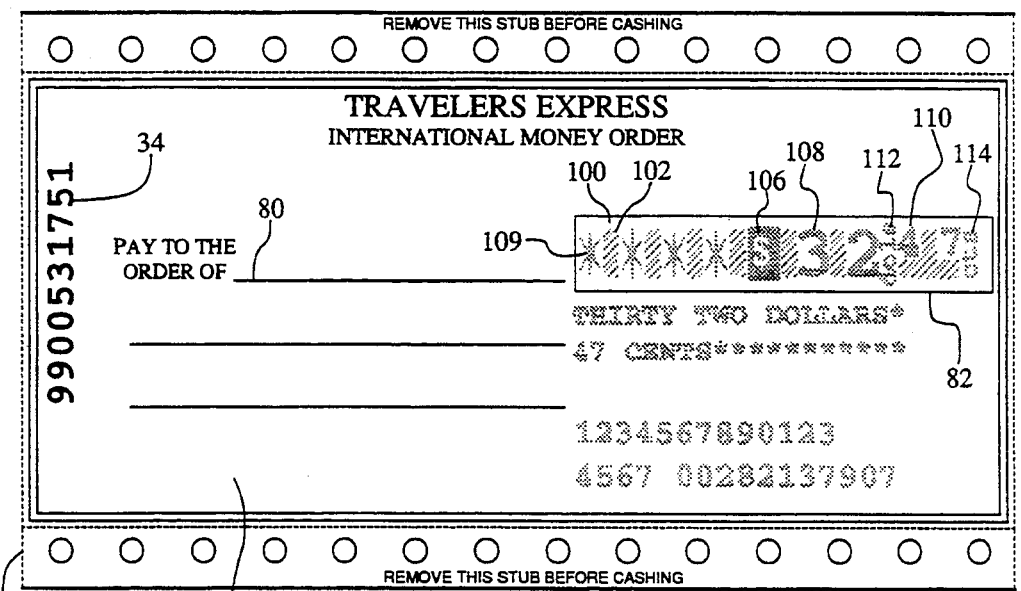
FIG. 8 is a top view of a money order form illustrating the printing of the "dollar" and "cent" amount using the security font.
Figure 10:
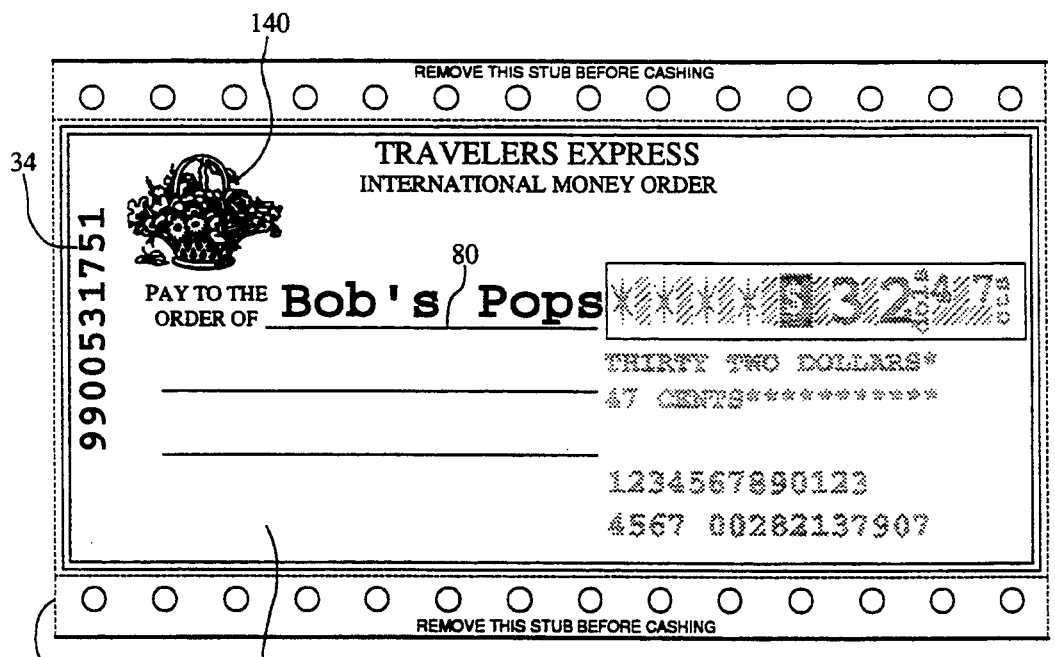
FIG. 10 is a top view of a printed money order form illustrating the printing of a logo and vendor's name and the payee blank on the preprinted form.

Referring now to FIGS. 8 and 9, the blank money order forms 24 have a serial number 34 printed along a leading edge 36 of the form 24. A timing mark 38 is placed on the back of each money order form 24 falling in a predetermined numbered sequence in the fan folded bundle 50 of money order forms 24. The corresponding serial number 34 of the particular money order form bearing the timing mark must be evenly devisable by the number of the position location of the form in the bundle. In other words, if the timing mark 38 appears on every fourth money order form, the serial number 34 of the fourth money order form should be devisable by four. When the mark 38 is sensed by a sensing mechanism contained within the printer 20, the serial number 34 is read and a determination made whether it is devisable by the appropriate number. If not, printing of the money order will not occur and the sequence and alignment of the money order forms 24 must be checked by the operator of the dispenser 10. Thus, the timing marks 38 prevent the unauthorized removal of a blank money order form, which would result in an out of sequence serial number 34.

Figure 6:
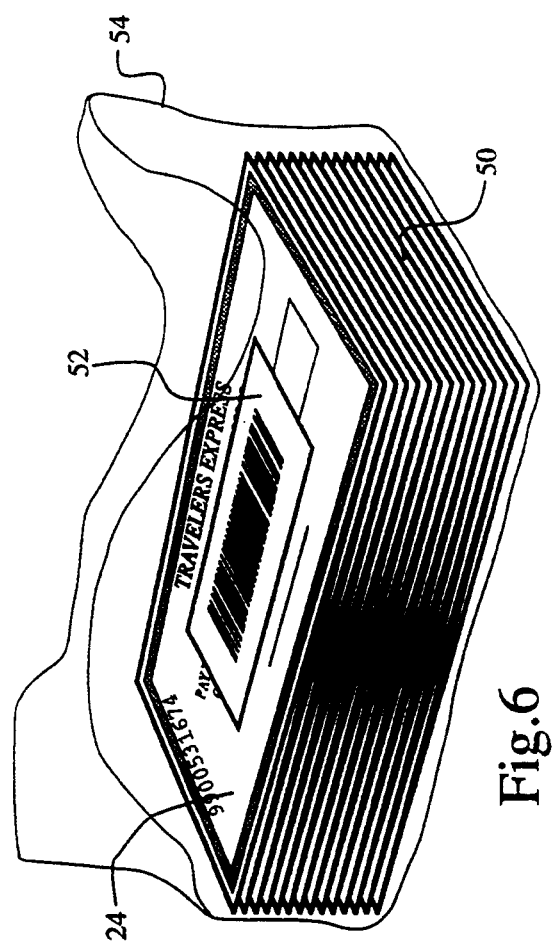
FIG. 6 is an exploded view of a bundle of fan folded money order forms packaged with an associated magnetic card in shrink wrapped packaging.

Referring now to FIG. 6, the blank money order forms 24 are packaged in fan folded bundles 50 containing a predetermined number of blank forms 24. A magnetic card 52 encoded with information such as the size of the money order forms, which may come in six or eight inch lengths, the number of forms in the bundle 50, and the serial numbers 34 of the forms 24 contained in the bundles 50 is packaged with each bundle 50. The bundles 50 may be packaged in any conventional packaging such as shrink wrap 54 as shown in FIG. 6.

For ease in loading the money order forms 24 into the housing 22 of the printer 20, the magnetic card 52 is passed through a card swipe device 56 connected to the control terminal 12. The card swipe device 56 reads the encoded information relating to the bundle 50 of money order forms 24, automatically entering the serial numbers 34 of the forms 24 into the memory 18 associated with the control terminal 12. Thus, the card swipe feature allows simplified reloading of money order forms 24 and alleviates the need of manual entry of the first and last serial numbers 34 in a series of blank forms 24, as has been required in prior automatic money order dispensers.

Most money order agents work with vendors who provide goods and services to the agent on a regular basis. Oftentimes for convenience and accounting purposes, vendor payments will be made with money orders. When a typical money order is purchased it is printed with a "dollar" amount and the payee line is left blank to be filled in by the purchaser. In the case of vendor payments, a blank payee line could result in the unauthorized negotiation of the money order by the vendor's representative. To prevent such unauthorized negotiation a plurality of vendor names may be stored in the memory 18 associated with the terminal 12. Thus, when a money order is issued for a vendor payment, the appropriately coded vendor name is downloaded to the memory 40 associated with the printer 20 and is printed on the payee line 80 on the blank money order form 24, as shown in FIG. 9.

As a further security measure, the numeric amount 82 of the money order is printed on the form 24 in a specially programmed security font 100 as shown in FIG. 8. The font 100 includes diagonal lineations 102 between asterisks 104 used to fill space not occupied by numerals representing dollar amounts. The diagonal lineations 102 also extend between the last appearing spacing asterisk 104 and a negatively printed "$" 106 which is defined not by printing the "$" 106 but by printing the background 10 surrounding the "$" 106. Thus, where the other printed indicia appears dark on a light background the "$" 106 appears light on a dark background immediately surrounding the "$" 106.

Diagonal lineation 102 separates the "$" 106 from the first numeral 108 of the dollar amount. The last numeral 108 of the dollar amount and the first numeral 110 representing the amount in cents is separated by a vertically printed abbreviation 112 of the word "dollars". The numerals 110 representing the amount in cents are approximately half the height of the numerals 108 representing the dollar amounts. Diagonal lineations 102 separate the numerals 110 representing the amount in cents and the area immediately below each of the numerals 110 representing the amount in cents. Immediately following the last numeral 110 in the cent amount is a vertically printed abbreviation 114 of the word "cents". The various characters and configuration of the security font 100 are very difficult, if not impossible, to alter, thereby substantially reducing the risk of alteration of the dollar amount printed on the form.

Referring now to FIG. 9, in the event a particular agent wishes to print its logo 140 on the money order form 24, the logo 140 is downloaded from the host or agent computer to the control terminal 12, which in turn downloads the logo 140 to the memory 40 associated with printer 20 for printing on the money order form 24. Following the initial download to the memory 40 the logo resides in the memory 40.

For purposes of internal control and operator security, the control terminal 12 and printer 20 are controlled and the memories 18 and 40 associated therewith may be reprogrammed at varying security levels. Many of the functions and operations of the money order dispenser 10 may be reprogrammed and controlled only from the host computer 48. A host security code which is contained within the operating program stored in the memory 18 associated with the control terminal 12 must be entered from the host computer 48 to perform functions flagged with a host level security code.

Various other functions may be performed and fields reprogrammed through use of an agent security code. As the security risk lessens, or the particular need to access a function becomes user specific, the security code required to access the particular function will vary. Thus, there are five levels of security codes, with various privileges assigned each security level as defined within the operating program contained in the memory of the control terminal 12.

The five security code levels include the host level, which may be accessed only by the host computer 48; the agent level, which may be accessed by the agent through the agent's computer 42, and in most situations the host computer 48; the store level which may be accessed through the keyboard 14 at the particular store location and which may in most cases be accessed through the agent and host level security codes. In addition to the store security code, a manager security code allows access to various functions and programmable fields through the keyboard 14 of the control terminal 12 in each particular store. The manager's security code is limited, however, to that particular store. The fifth level of security code is the employee level having associated therewith the fewest number of privileges necessary for printing money orders.

The privileges associated with each security code level may be reprogrammed at varying levels of security, as defined in the program operating the control terminal 12. By way of example, an employee must enter an employee's security code before a money order will print. In the event an amount is entered into the control terminal 12 which exceeds a maximum transaction dollar limit for that particular location, a manager code must be entered to allow printing of the money order. A daily total dollar amount limit may only be reset at the host security level. Host phone numbers stored in the system which are used to dial the host computer to upload information to the host computer may be changed by host, agent, or at the store security level through the keyboard. Thus, the multilevel security codes further insure security of the money order dispenser 10 against tampering and issuance of counterfeit money orders.

Figure 11:
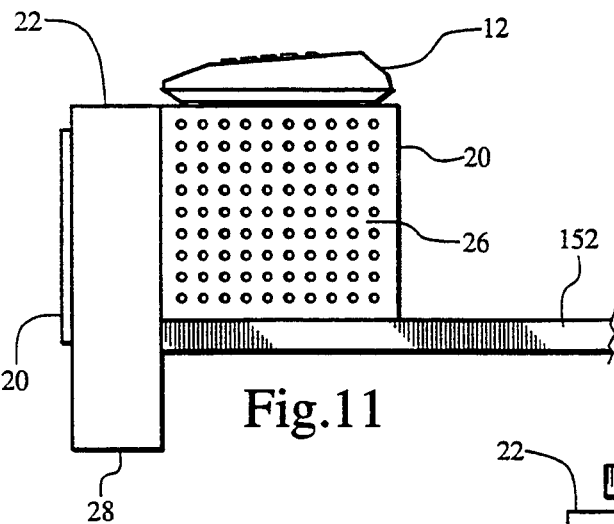
FIG. 11 is a side view of the printer and terminal of FIG. 1 illustrating positioning of the printer to be supported on and extend over the edge of a countertop.
Figure 12:
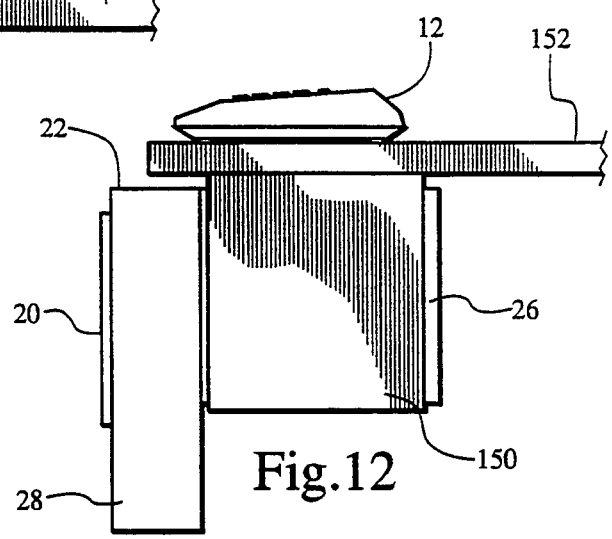
FIG. 12 is a side view of the printer and terminal of FIG. 1 showing positioning of the printer under a counter ledge.
Figure 14:
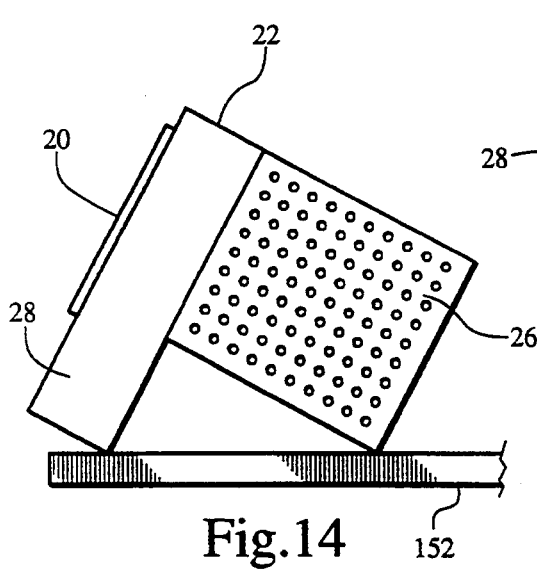
FIG. 14 is a side view of the printer of FIG. 1 illustrating the positioning of the printer on top of the counter to provide a diagonally sloped money order emitting surface.
Figure 13:
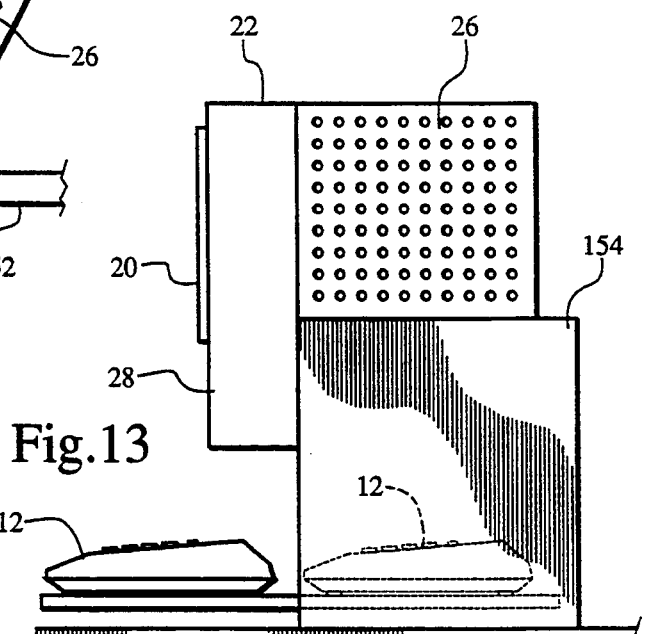
FIG. 13 is a side view of the printer and terminal of FIG. 1 illustrating the positioning of the printer over an object on the counter top.

The physical configuration of the two-part money order dispenser 10 allows for a variety of placements and positioning of the control terminal 12 and printer 20 at the agent's premises. Thus, where there is limited or crowded counter space, the printer 20 and control terminal 12 may be stacked as shown in FIG. 11. Where counter space is limited, the printer 20 may be supported by a bracket 150 mounted to the underside of a desk or counter top 152 or suspended from an overhead shelf, as shown in FIG. 12. Likewise, the printer may be stacked on top of other items supported on the counter top 152 as shown in FIG. 13. The printer may be placed entirely on the counter top 152 as shown in FIG. 14 where a diagonally slopped money order writing surface is desired.

In addition to allowing for efficient space utilization, the two-part configuration of the money order dispenser 10 allows the terminal 12 to be maintained close to the employee, which is often close to the consumer or public. The printer 20, however, may be placed at a distance away from the consumer or public, to prevent unauthorized removal of a printed money order from the printer 20.

Thus, the advantages of the money order dispenser of the present invention include the enhanced security features of the multilevel security codes allowing varying levels of access depending upon the security level of the user, the security font which deters alteration of the dollar amount printed on the form, the encrypted password which prevents use of the printer 20 from an unauthorized computer, the physical retraction of the money order forms 24 into the housing 22 when a money order is not being printed, and the timing marks 38 evidencing an out of sequence serial number 34. The convenience of the dispenser 10 is increased by the interface of one or both parts of the money order dispenser 10 with existing point of sale equipment 60, agent computer systems 42, and multiple terminals 44 in a single location, as well as the physical convenience of space utilization afforded by the configuration of the printer housing 22 and the separation of the printer 20 and terminal 12 into two-parts. The card swipe and timing marks 38 increase the efficiency of loading and printing money order forms 24. Thus, the money order dispenser 10 of the present invention provides a physically and functionally convenient method of dispensing money orders with optimal security and efficiency.

Although preferred embodiments of the present invention has been illustrated in the accompanying Drawings and described in the foregoing Detailed Description, it will be appreciated by those skilled in the art that various modifications and rearrangements of the component parts and elements of the present invention are possible within the scope of the present invention.

We claim:

1. A dispenser for issuing negotiable instruments comprising:
   a control terminal;
   a keyboard connected to the control terminal for entering data and operating the control terminal;
   memory means associated with the control terminal for storing control programs, control data, multiple level security codes having associated privileges at different security levels, and transaction data;

a printer for printing alphanumeric indicia on preprinted negotiable instrument forms;

memory means associated with the printer for storing printer control programs, print instructions received from the control terminal, and transaction data;

means connecting the terminal to the printer for communicating print instructions from the control terminal and for communicating an encrypted message instructing that an algorithm be performed to issue a password signalling the printer to proceed with the printing of a document;

means connected to the control terminal for reading a magnetically encoded card for automatically entering information into the control terminal relating to the number of negotiable instrument forms, size of form, and serial numbers of a specific series of blank negotiable instrument forms being loaded into the printer;

retraction means for retracting unprinted negotiable instrument forms for preventing removal of negotiable instrument forms from the printer when not printing;

sensor means in the printer for detecting timing marks printed on the back of negotiable instrument forms at predetermined spaced apart intervals in a series of blank negotiable instrument forms for insuring alignment and serial number sequencing of the next available form before printing and for determining the size of the forms being printed; and printer housing having an angled configuration for adaptive positioning in relation to limited availability of a supporting surface.

2. The negotiable instrument dispenser of claim 1, wherein the means for reading a magnetic card for automatically entering blank negotiable instrument form information into the control terminal comprises a card swipe device connected for communication with the control terminal.

3. The negotiable instrument dispenser of claim 1, further comprising communication means connecting the printer directly to a point of sale apparatus for communication of printing data and instructions from the point of sale apparatus to the printer.

4. The negotiable instrument dispenser of claim 1, further comprising communication means for connecting the control terminal to a remote computer for interrogation and programming of the memory associated with the terminal.

5. The negotiable instrument dispenser of claim 1, further comprising means for detecting multilevel definable security codes for limiting the access to security flagged functions.

6. The negotiable instrument dispenser of claim 1, wherein the printer further comprises means for printing the numeric amount of the negotiable instrument in a security font style having diagonal lineation between spacing asterisks and between the numerals of the dollar and cent amounts, vertically printed abbreviations of the words "dollars" and "cents", and an unprinted dollar sign defined by the printing of a surrounding background for reducing the risk of alteration of the printed amount of the negotiable instrument.

7. The negotiable instrument dispenser of claim 1, further comprising means for instructing the printer to print alphanumeric indicia on blank negotiable instrument forms of a plurality of sizes.

8. An apparatus for printing and dispensing negotiable instruments comprising:

print means for printing negotiable instruments and sales reports;

memory means associated with the print means for storing operating programs, logos, and transaction data;

a terminal connected to the print means for controlling the printer;

memory means associated with the terminal for storing operating programs, programmable security codes, and transaction data;

means for initiating and blocking communication with the print means; and retraction means for retracting unprinted negotiable instrument forms for preventing removal of blank negotiable instrument forms from the printer when printing of a preceding negotiable instrument has been completed and when the print means is in a power off condition.

9. The apparatus of claim 8, wherein access to the printer requires an algorithm for decryption of an encrypted password based upon the serial number of the printer.

10. The apparatus of claim 8, further comprising a keyboard connected to the terminal for programming and data entry.

11. The apparatus of claim 8, further comprising display means connected to the terminal for displaying transaction data.

12. The apparatus of claim 8, further comprising means connected to the terminal for reading a magnetically encoded card for automatically entering information into the terminal regarding the number of negotiable instrument forms in an associated bundle of forms being loaded into the printer, the size of the forms, and the serial numbers of the forms in the bundle.

13. The apparatus of claim 12, wherein the means for reading a magnetic card for automatically entering blank negotiable instrument form information into the terminal comprises a card swipe device connected for communication with the terminal.

14. The apparatus of claim 8, further comprising sensor means in the printer for detecting preprinted timing marks on the back of the negotiable instrument forms at predetermined intervals in a series of forms for insuring alignment and serial number sequencing of the next available form before printing a form and for determining the size of the form being printed.

15. The apparatus of claim 14, wherein the sensor means prohibits the printing of a negotiable instrument when the serial number of the negotiable instrument form is not evenly divisible by a number representing the distance, in number of forms, separating the forms bearing the timing marks.

16. The apparatus of claim 8, further comprising a printer housing having an angled configuration for adaptive positioning in relation to limited availability of a supporting surface.

17. The apparatus of claim 16, wherein the housing further comprises a square body portion and a face portion attached to and extending outwardly and downwardly from the body portion to form a generally "L" shaped housing.

18. The apparatus of claim 8, further comprising communication means connecting the printer to point of sale apparatus for communication between the point of sale apparatus and the printer.

19. The apparatus of claim 8, further comprising communication means connecting the terminal to a remote computer for remote interrogation and programming of the memory associated with the terminal and for printing of reports on a printer connected to the computer.

20. The apparatus of claim 8, further comprising a journal printer connected to the terminal for printing negotiable instrument sales reports.

21. The apparatus of claim 8, further comprising a host computer connected to the terminal for controlling various functions of the terminal and printer and for remote interrogation of the terminal.

22. The apparatus of claim 8, further comprising means for detecting multilevel, programmable, user security codes for limiting the accessibility to specific apparatus functions depending upon the security level of the user code.

23. The apparatus of claim 8, further comprising means for printing the numeric amount of the negotiable instrument in a security font style comprising diagonal lineation between spacing asterisks and between numerals of a dollar and cent amount, vertically printed abbreviations of the words "dollars" and "cents", and an unprinted dollar sign defined by the printing of a surrounding background for reducing the risk of alteration of the printed amount of the money order.

24. The apparatus of claim 8, further comprising means for instructing the print means to print alphanumeric indicia on blank negotiable instrument forms of a plurality of sizes.

25. The apparatus of claim 8, further comprising means for printing company logos on the negotiable instrument forms.

26. The apparatus of claim 25, further wherein the logos are initially downloaded from the terminal memory to the printer memory where they are retained for subsequent printing.

27. The apparatus of claim 8, further comprising means for printing a payee name on a payee line on the negotiable instrument form.

28. An apparatus for printing and dispensing money orders comprising:
   print means for printing money orders and sales reports;
   memory means associated with the print means for storing operating programs, logos, and transaction data;
   a terminal connected to the print means for controlling the printer;
   memory means associated with the terminal for storing operating programs, programmable security codes, and transaction data;
   means for initiating and blocking communication with the print means;
   a keyboard connected to the terminal for programming and data entry;
   display means connected to the terminal for displaying transaction data; and
   retraction means for retracting unprinted money order forms for preventing removal of blank money order forms from the print means when printing of a preceding money order has been completed and when the printer is in a power off condition.

29. The apparatus of claim 28, further comprising a card swipe device connected for communication with the terminal for reading a magnetically encoded card for automatically entering information into the terminal regarding the number of money order forms in an associated bundle of forms being loaded into the printer, the size of the forms, and the serial numbers of the forms in the bundle.

30. The apparatus of claim 28, further comprising sensor means in the printer for detecting preprinted timing marks on the back of the money order forms at predetermined intervals in a series of forms for prohibiting the printing of a money order when the serial number of the money order form is not evenly divisible by a number representing the distance, in number of forms, separating the forms bearing the timing marks.

31. The apparatus of claim 28, further comprising a printer housing having a square body portion and a face portion attached to and extending outwardly and downwardly from the body portion to form a generally "L" shaped housing for adaptive positioning in relation to limited availability of a supporting surface.

32. The apparatus of claim 28, further comprising communication means connecting the printer to point of sale apparatus for communication between the point of sale apparatus and the printer.

33. The apparatus of claim 28, further comprising a host computer connected to the terminal for controlling various functions of the terminal and printer and for remote interrogation of the terminal.

34. The apparatus of claim 28, further comprising means for detecting multilevel, programmable, user security codes for limiting the accessibility to specific apparatus functions depending upon the security level of the user code.

35. The apparatus of claim 28, further comprising means for printing the numeric amount of the money order in a security font style comprising diagonal lineation between spacing asterisks and between numerals of a dollar and cent amount, vertically printed abbreviations of the words "dollars" and "cents", and an unprinted dollar sign defined by the printing of a surrounding background for reducing the risk of alteration of the printed amount of the money order.

36. A money order dispenser comprising:
   print means for printing money orders and sales reports;
   memory means associated with the print means for storing operating programs, logos, and transaction data;
   a terminal connected to the print means for controlling the printer;
   memory means associated with the terminal for storing operating programs, programmable security codes, and transaction data;
   means for decryption of an encrypted password based upon the serial number of the print means for initiating communication with the print means;
   a keyboard connected to the terminal for programming and data entry;
   display means connected to the terminal for displaying transaction data;
   sensor means in the printer for detecting preprinted timing marks on the back of the money order forms at predetermined intervals in a series of forms for prohibiting the printing of a money order when the serial number of the money order form is not evenly divisible by a number representing the distance, in number of forms, separating the forms bearing the timing marks; and
   a printer housing having a square body portion and a face portion attached to and extending outwardly and downwardly from the body portion to form a generally "L" shaped housing for adaptive positioning in relation to limited availability of a supporting surface.

37. The apparatus of claim 36, further comprising retraction means for retracting unprinted money order forms for preventing removal of blank money order forms from the printer when printing of a preceding money order has been completed and when the printer is in a power off condition.

38. The apparatus of claim 36, further comprising a card swipe device connected for communication with the terminal for reading a magnetically encoded card for automatically entering information into the terminal regarding the number of money order forms in an associated bundle of forms being loaded into the printer, the size of the forms, and the serial numbers of the forms in the bundle.

39. The apparatus of claim 36, further comprising communication means connecting the printer to point of sale apparatus for communication between the point of sale apparatus and the printer.

40. The apparatus of claim 36, further comprising a host computer connected to the terminal for controlling various functions of the terminal and printer and for remote interrogation of the terminal.

41. The apparatus of claim 36, further comprising means for detecting multilevel, programmable, user security codes for limiting the accessibility to specific apparatus functions depending upon the security level of the user code.

42. The apparatus of claim 36, further comprising means for printing the numeric amount of the money order in a security font style comprising diagonal lineation between spacing asterisks and between numerals of a dollar and cent amount, vertically printed abbreviations of the words "dollars" and "cents", and an unprinted dollar sign defined by the printing of a surrounding background for reducing the risk of alteration of the printed amount of the money order.

* * * * *